(12) United States Patent
Lolis et al.

(10) Patent No.: US 8,705,675 B2
(45) Date of Patent: Apr. 22, 2014

(54) DEVICE AND METHOD FOR RECEIVING RF SIGNALS BASED ON HETERODYNE ARCHITECTURE USING COMPLEX IF SUBSAMPLING

(75) Inventors: Luis Lolis, Grenoble (FR); Michael Pelissier, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 29 days.

(21) Appl. No.: 13/516,490

(22) PCT Filed: Dec. 16, 2010

(86) PCT No.: PCT/EP2010/069989
§ 371 (c)(1),
(2), (4) Date: Jun. 15, 2012

(87) PCT Pub. No.: WO2011/073357
PCT Pub. Date: Jun. 23, 2011

(65) Prior Publication Data
US 2012/0250810 A1    Oct. 4, 2012

(30) Foreign Application Priority Data
Dec. 18, 2009    (FR) ...................................... 09 59216

(51) Int. Cl.
*H04B 1/00*    (2006.01)
(52) U.S. Cl.
USPC ..... 375/350; 375/316; 324/76.41; 324/76.43; 324/76.45; 324/76.44; 327/557; 327/555; 455/209; 455/213; 455/226.1; 455/226.3; 455/339; 455/340; 455/337; 455/293; 708/313; 708/300

(58) Field of Classification Search
USPC ..................... 324/76.41, 76.43, 76.45, 76.44; 327/557, 555; 708/339, 340, 313.3; 375/316, 350, 346, 260; 455/209, 213, 455/226.1, 226.3, 339, 340, 337, 293
See application file for complete search history.

(56) References Cited

U.S. PATENT DOCUMENTS 7,023,245 B2    4/2006    Yuan
2002/0081988 A1*    6/2002    Parker ........................... 455/296
(Continued)

FOREIGN PATENT DOCUMENTS

FR    2 911 449 A1    7/2008
WO    WO 2909/091822 A1    7/2009

OTHER PUBLICATIONS

International Search Report issued Feb. 23, 2011 in Application No. PCT/EP2010/069989.

(Continued)

*Primary Examiner* — Daniel Washburn
*Assistant Examiner* — Rahel Guarino
(74) *Attorney, Agent, or Firm* — Oblon, Spivak, McClelland, Maier & Neustadt, L.L.P.

(57) ABSTRACT

An RF signal reception device including: a transposition device of signals of frequency $f_{RF}$ to a first intermediate frequency $IF1 < f_{RF}$; a first bandpass filter centered on IF1; a sampler at a frequency $fs < IF1$; a second discrete-time filter centered on a second intermediate frequency $IF2 = \alpha \cdot fs/M + fs/(M \cdot n)$; a decimation device of a factor M; an analog-digital convertor to operate at a frequency $fs/M$; where $\alpha$, n and M are strictly positive real numbers chosen such that: $\alpha < fs/(2 \cdot BW_{ch} \cdot M)$, and $BW_{ch}/2 < fs/M \cdot n$), with $BW_{ch}$: bandwidth of a channel of the received RF signals.

16 Claims, 7 Drawing Sheets

(56) References Cited

U.S. PATENT DOCUMENTS

Figure 1:
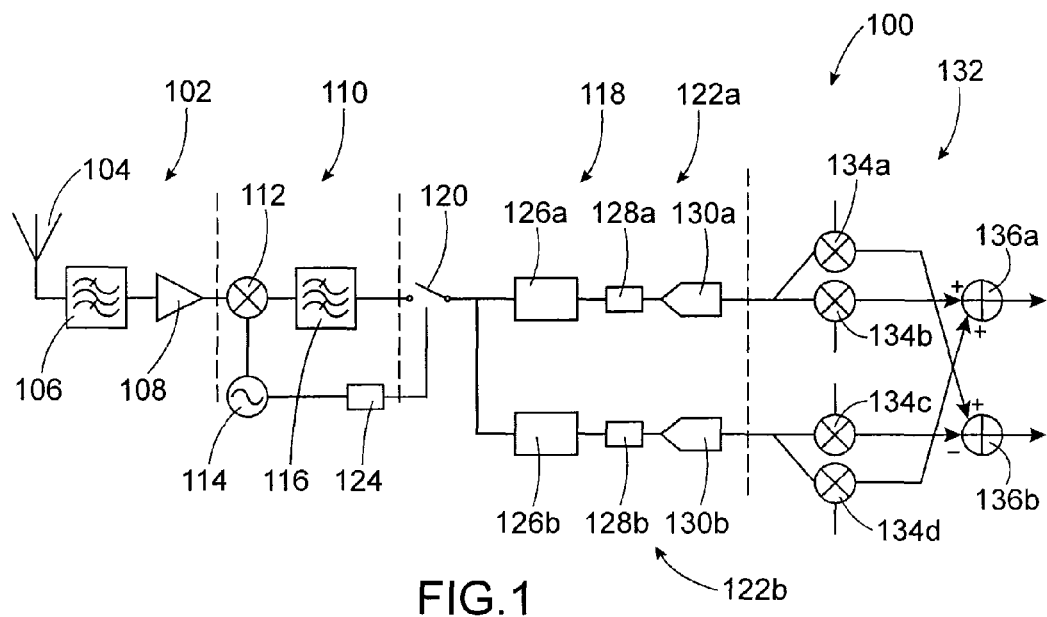

| | | |
|---|---|---|
| 2005/0144650 A1* | 6/2005 | Tu et al. .................... 725/131 |
| 2005/0168371 A1 | 8/2005 | Yuan |
| 2005/0176397 A1 | 8/2005 | Yuan |
| 2007/0140382 A1 | 6/2007 | Qian |
| 2009/0002066 A1 | 1/2009 | Lee et al. |
| 2009/0017785 A1 | 1/2009 | Qian |
| 2009/0179786 A1 | 7/2009 | Martellock et al. |
| 2010/0179977 A1 | 7/2010 | Wei et al. |

OTHER PUBLICATIONS

International Preliminary Report on Patentability issued Aug. 9, 2012 in Application No. PCT/EP2010/069989.

Darius Jakonis, et al., "A 2.4-GHz RF Sampling Receiver Front-End in 0.18-μm CMOS", IEEE Journal of Solid-State Circuits, vol. 40, No. 6, Jun. 2005, pp. 1265-1277.

Mehmet R. Yuce, et al., "Design and performance of a wideband sub-sampling front-end for multi-standard radios", Int. J. Electron. Commun., vol. 62, 2008, pp. 41-48.

Gang Xu, et al., "Performance Analysis of General Charge Sampling", IEEE Transactions on Circuits and Systems-II: Express Briefs, vol. 52, No. 2, Feb. 2005, pp. 107-111.

Preliminary Search Report issued Jul. 13, 2010 in French Patent Application No. 0959216 with English translation of categories of cited documents.

James Wei, et al., "A Programmable Complex FIR Filter with Integrated MEMS Filter for Front-end Charge Sampling Receiver", IEEE, 2006, pp. 1125-1128.

Kenneth W. Martin, "Complex Signal Processing is Not Complex", IEEE Transactions on Circuits and Systems-I:Regular Papers, vol. 51, No. 9, Sep. 2004, pp. 1823-1836.

Rodney G. Vaughan, et al., "The Theory of Bandpass Sampling", IEEE Transactions on Signal Processing, vol. 39, No. 9, Sep. 1991, pp. 1973-1984.

Anis Latiri, "Architecture and Design of a Reconfigurable RF Sampling Receiver for Multistandard Applications", Ecole Télécom Paris Tech. France, Apr. 10, 2009. 141 pages.

* cited by examiner

DEVICE AND METHOD FOR RECEIVING RF SIGNALS BASED ON HETERODYNE ARCHITECTURE USING COMPLEX IF SUBSAMPLING

TECHNICAL FIELD

The invention concerns the field of reception of radio frequency (RF) signals, and more specifically that of RF receivers with sampled architectures.

The invention notably concerns a device and a method for receiving signals according to communication standards such as the "Bluetooth Low Energy", IEEE 802.15.4 or "ZigBee" standards, for example implemented for applications in wireless personal area networks (WPAN), wireless body area networks (WBAN), notably in the medical field, or again wireless sensor and actuator networks (WS&AN), or any other application having channels with a low bandwidth, for example less than 4 MHz. The invention can notably be used in communicating devices with a high dynamic range having compatibility between several standards (multi-standard data reception).

STATE OF THE PRIOR ART

In RF receivers with sampled architectures, the reconfigurable character of these receivers enables multiple communication standards to be demodulated more easily. To accomplish this, one of the techniques capable of transposing the signal in the discrete time field, and then of transposing it as a frequency, consists in subsampling the signal.

Subsampling consists in sampling a signal modulated at a carrier frequency fc and of low bandwidth BW, such that BW<<fc, at a sampling frequency fs less than one satisfied by the Shannon theorem. In the case of subsampling the following therefore applies:

$$fs < 2 \cdot fc$$

The signal then obtained in the baseband corresponds to a product of a convolution of a multiple of the sampling frequency fs with the signal itself. By defining a variable n such that $(n-1) \cdot fs/2 < f_L$ and $n \cdot fs/2 > f_H$, with $f_L$ and $f_H$ such that $BW_{ch} = f_H - f_L$ (where $BW_{ch}$ is the bandwidth of a channel of the RF signals received), the distance between $(n-1) \cdot fs/2$ and fc (which is equal to $(f_H + f_L)/2$) defines the baseband frequency to which the signal is transposed.

Use of subsampling in an RF reception device nonetheless requires certain constraints to be taken into account. Indeed, communication standards generally include profiles of interferers which can be placed in the spectrum close to the multiples of the sampling frequency. Consequently, after the signal has been transposed into frequencies, the interferers can be found in the baseband mixed with the spectrum of the signal. In addition, since the system's thermal noise is broadband, this noise is aliased in the baseband.

There are two categories of subsampling architectures: those which accomplish charge sampling, also called current sampling, and those which accomplish voltage sampling.

Documents U.S. Pat. No. 7,023,245 B2 and "Performance analysis of general charge sampling" by G. Xu and J. Yuan, IEEE Transactions on Circuits and Systems II: Express Briefs, vol. 52, no 2, pages 107-111, February 2005, describe examples of charge sampling architectures. This type of sampling consists in transforming the voltage signal into a current signal, integrating this current over a given time period, and then in freezing the value of the signal in order that an analog-digital converter (CAN) is able to read it. Integration of the produced signal corresponds to a filtering function which rejects the interferences (noise+interferers) at the multiples of the sampling frequency, which is an advantageous characteristic from the filtering standpoint. However, if the useful signal centred on fc exceeds the order of magnitude of sampling frequency fs, the implemented filtering function then begins to reject the signal of interest. Such architecture therefore requires that a high sampling frequency is used. And, given that the electrical consumption of the receiver circuit is dependent on the highest frequency generated in the circuit (where the elements generating these high frequencies can account for nearly 40% of the total electrical consumption of the receiving device), such architecture does not therefore enable the receiver's electrical consumption to be reduced significantly. In addition, when the signal is sent in the baseband, the properties of the analog components relative to the non-linearities and to the noise forms an important source of distortions of the signal (for example: 1/f noise, offset DC, second-order non-linearities).

Documents US 2007/0140382 A1 and US 2009/0017785 A1 describe subsampling architectures in which the in-phase and quadrature paths are separated by choosing a phase shift between the sampling signals so as to create a phase shift of N*90° (where N is an odd number) at the signal's central frequency fc. This type of architecture nevertheless implies that a polyphase clock is used. In addition, when the signal is reduced to a zero intermediate frequency ("zero-IF"), problems relating to the 1/f noise and offset DC are then posed. Finally, there are potentially gain and phase differences between the channels. When the signal is reduced to the low intermediate frequency ("low-IF"), the image rejection becomes more limited as the subsampling rate (N=2*fc/fs) increases.

In the case of a voltage sampling architecture as described in documents WO 2009/091822 A1 and "A 2.4-GHz RF sampling receiver front-end in 0.18-μm CMOS" by D. Jakonis et al., IEEE Journal of Solid-State Circuits, vol. 40, no 6, pages 1265-1277, June 2005, there is no signal integration step, which in theory allows a smaller sampling frequency to be used than that used in a charge sampling architecture. However, the image filtering is managed by a device external to the sampler, formed for example by an RF filter and an LNA (low-noise amplifier) installed upstream from the sampler and operating at the RF frequencies, i.e. at the frequencies of the received RF signals. However, such a filter has low selectivity, which implies that a second filter operating at an intermediate IF frequency higher than twice the RF bandwidth is used, this frequency being higher the greater the signal's RF bandwidth, in order to prevent any aliasing during sampling. Given that, in this architecture, the sampling frequency is defined by the relationship fs=4·1F in order to accomplish a separation of the in-phase and quadrature paths of the IF signal, and to accomplish image filtering, a relatively high sampling frequency is therefore found in this case too, which does not allow a significant reduction of the receiver's electrical consumption. In addition, in order to attain the required rejection, such an architecture must use a filtering network in discrete time including a substantial filtering order (24 in this document), which leads to area and electrical consumption constraints for this type of reception architecture.

It can therefore be seen that the RF reception devices of the prior art accomplishing subsampling of the signal pose several problems:
the reference frequencies used (frequency of the sampler, intermediate frequency) are at least equal to frequency $f_{RF}/2$ in the case of voltage sampling architectures, and at least equal to frequency $f_{RF}$ in the case of charge sampling architectures, which does not enable the receiver's total electrical consumption to be reduced significantly, in the case of architectures transposing the signal directly in the baseband, the properties of the analog components relative to the non-linearities and to the noise are a major source of distortions of the signal, using discrete-time filtering networks with a high filtering order demands a large area for the accomplishment of such networks, and also represents a source of substantial electrical power consumption.

ACCOUNT OF THE INVENTION

One aim of the present invention is to provide an RF signal reception device which does not have the abovementioned disadvantages of the prior art.

To accomplish this, the present invention provides an RF signal reception device including at least:

means of transposition of signals of frequency $f_{RF}$ to a first intermediate frequency $IF1 < f_{RF}$, first bandpass filtering means centred on IF1 of signals transposed to IF1, means of sampling at a frequency $fs < IF1$ of signals delivered by the first filtering means, transposing said signals delivered by the first filtering means to a second intermediate frequency $IF2 = \alpha \cdot fs/M + fs/(M \cdot n)$, second discrete-time filtering means centred on the second intermediate frequency IF2 of samples delivered by the sampling means, means of decimation of a factor M of samples delivered by the second filtering means, transposing the samples delivered by the second filtering means to a third intermediate frequency $IF3 = fs/(M \cdot n)$, means for analog-digital conversion, operating at a frequency $fs/M$, of samples delivered by the decimation means, where $\alpha$, n and M are strictly positive real numbers chosen such that:

$$\alpha < fs/(2 \cdot BW_{ch} \cdot M), \text{ and}$$

$$BW_{ch}/2 < fs/(M \cdot n),$$

with $BW_{ch}$: bandwidth of a channel of the received RF signals.

The invention therefore provides an RF reception device including a voltage sampling architecture which does not require the generation of signals of high frequencies, thus enabling the reception device according to the invention to have a low electrical consumption (for example allowing a gain of approximately 30% to be obtained compared to the devices of the prior art).

The reception device relies on a triple frequency transposition to three intermediate frequencies IF1, IF2 and IF3, where IF1>IF2>IF3, before the useful signal is converted into a digital baseband.

The reception device according to the invention will be particularly advantageous from the standpoint of the electrical consumption of the frequency synthesis when the first intermediate frequency IF1 is chosen relatively high, for example higher than approximately 2 GHz.

The sampling means at frequency fs of the signals delivered by the first filtering means enable the signal to be transposed to second intermediate frequency IF2.

The means of decimation of a factor M of the samples delivered by the second filtering means enable the signal to be transposed to third intermediate frequency $IF3 = fs/(M \cdot n)$, which is of the order of magnitude of $BW_{ch}$ (for example, less than 6 MHz), which lessens the constraints relative to the design of the device relating to the problems of offset DC, l/f noise and second-order intermodulation products. In addition, the invention may have a subsampling rate greater than 30.

In addition, given that the reception device does not transpose the RF signal directly to the baseband, the device according to the invention does not require, for its production, very high value capacitors which require a large area of silicon for their production. Nor does the device according to the invention include discrete-time filtering networks with a high filtering order, which also require a substantial area of silicon for their production.

Through a first frequency transposition of the RF signal to frequency IF1, the useful band of the signal to be sampled is reduced from $BW_{RF}$, corresponding to the total bandwidth of the RF signal, to $BW_{ch}$, corresponding to the bandwidth of the channel of interest of the received signal, allowing the signal to be transposed to a frequency IF2 which is notably lower than in the receivers of the prior art, without however causing aliasing.

By accomplishing a complex bandpass filtering centred on frequency $IF2 = \alpha \cdot fs/M + fs/(M \cdot n)$, the discrete-time filtering function of the reception device is used optimally, since such filtering enables the image filtering and anti-aliasing rejections required with a filtering of a lower order than the one required in the architectures of the prior art to be achieved. Consequently, when these second filtering means are produced from switched capacitors, such a filter can be produced from a smaller number of switched capacitors than for the intermediate filters of the architectures of the prior art, thus causing fewer losses in the filtered signals, and having a lesser sensitivity to the technological variations relating to the production of the elements of the receiver device.

Bearing in mind the discrete-time processing of the signal accomplished by the second filtering means, and the subsampling architecture of the invention, the device according to the invention is also in keeping with the development of integrated circuits, which is to produce the maximum number of discrete-time, not continuous-time, processing functions.

In addition, unlike the architectures of the prior art, the paths can be separated by choosing the coefficients of the filter.

The second filtering means may include at least one infinite impulse response (IIR) filter. Such an IIR filter has a response which is much more selective than that of a finite impulse response (FIR) filter of the same order centred on a given frequency. Such a filter notably enables the constraints relating to the analog-digital conversion means to be lessened appreciably. This filter may be produced, for example, from four switched capacitors. This filter not only enables image frequencies and aliasing to be eliminated, but also enables channel filtering of the useful signal in order to eliminate the adjacent channels.

The means of transposition of signals of frequency $f_{RF}$ to first intermediate frequency IF1 may include a mixer able to accomplish a frequency convolution between signals of frequency $f_{RF}$, of between a maximum value $f_{RFmax}$ and a minimum value $f_{RFmin}$, and a signal intended to be delivered by a local oscillator of frequency $f_{OL}$ of between $f_{RF}min-IF1$ and $f_{RF}max-IF1$, such that:

$$IF1 = N \cdot fs + IF2 = N \cdot fs + \alpha \cdot fs/M + fs/(M \cdot n), \text{ and}$$

$$IF1 = f_{RF} - f_{OL}, \text{ with } f_{OL} = K \cdot fs,$$

Where K is a ratio chosen between $f_{OL}$ and fs, and N is the order of the harmonic transposing the signal from frequency IF1 to frequency IF2.

It can thus be seen that frequencies IF1 and IF2 of the different filterings accomplished, together with sampling frequency fs and the frequency at which the analog-digital conversion is accomplished, namely IF3=fs/(M·n), are interdependent.

Frequency fs and parameters N, $\alpha$, M, n and K may be chosen such that first intermediate frequency IF1 is compatible with the implementation of a filter at intermediate frequency IF1 with an adequate bandwidth, i.e. one which is at least equal to $BW_{ch}$, between $IF1c-BW_{IF\_filter}/2$ and $IF1c+BW_{IF\_filter}/2$, where $BW_{IF\_filter}$ is the bandwidth of the analog filtering accomplished at IF1 and IF1c is the central frequency of the range of variation of IF1 noted $\Delta$IF1. By considering the frequency of a local oscillator such that $f_{OL}=f_{RF}-IF1$, used to accomplish the frequency displacement from $f_{RF}$ to IF1, a factor K relating this local oscillator frequency to the sampling frequency such that $f_{OL}=K\cdot fs$ may be defined. Variation step $\Delta K$ of this factor K may depend notably on the variation permitted for the value of IF1. For example, for $\Delta IF1=15$ MHz, the step of K may then be $\Delta K=0.5$.

Frequency fs and parameters N, $\alpha$, M, n and K may be chosen such that the variation of the first intermediate frequency IF1 is suited to the possibilities of the technology of the IF1 filter. Thus, frequency fs and parameters $\alpha$, n, M, N and K can be chosen such that:

$$BW_{IF1} \geq \Delta IF1 + BW_{ch}/2$$

with $BW_{IF1}$: bandwidth of the first filtering means, and
$\Delta IF1$: variation of IF1 when $f_{RF}$ varies between $f_{RFmax}$ and $f_{RFmin}$.

When $f_{OL}$ and fs are, for example, not related by factor K, frequency fs and parameters $\alpha$, n and M may be chosen such that:

$$BW_{IF1} \geq 2BW_{ch}$$

with $BW_{IF1}$: bandwidth of the first filtering means,

Ratio K may be chosen such that there is a digital frequency synthesis of the single fractional DDS (Direct Digital Synthesis) or PLL (Phase Locked Loop) type which controls the local oscillator ($f_{OL}$) and the sampling (fs).

The device may also include at least one reception antenna connected to an input of bandpass filtering means centred on frequency $f_{RF}$, one output of which is connected to an input of a low-noise amplifier, where the output of the low-noise amplifier is connected to an input of means of transposition of signals of frequency $f_{RF}$ to first intermediate frequency IF1. These additional elements thus complete the reception device by forming a first stage of processing of the received RF signals.

The bandwidth of the bandpass filtering means centred on frequency $f_{RF}$ may also be equal to or greater than the total bandwidth of the channels of the RF signals intended to be received by the antenna and/or the bandpass filtering means centred on frequency $f_{RF}$ may include at least one passive filter, for example of the BAW/FBAR type (i.e. including a bulk acoustic wave resonator).

The first bandpass filtering means centred on IF1 may include at least one filter of the BAW type, for example of the BAW/FBAR or Lamb wave BAW type, and/or when the means of transposition of signals of frequency $f_{RF}$ to first intermediate frequency IF1 include a local oscillator, said local oscillator may include a resonator of the BAW type. It is thus possible to use the same piezoelectric technology to produce the RF broadband filter and/or the IF1 channel narrowband filter and/or the resonator of the local oscillator used to generate reference frequency $f_{OL}$ in the reception chain. Integration of these three components may be, in this case, accomplished from a single piezoelectric layer, for example AlN-based, where these elements may each have a roughly similar thickness, and may be produced from the implementation of standard lithography steps.

The device may also include means of selective distribution of the in-phase and quadrature components of the samples delivered by the sampling means in different paths, and in which the second discrete-time filtering means, the decimation means and the analog-digital conversion means may be present in each of the paths. The combination of these paths may represent the proposed complex discrete-time filtering function.

The device may also include means for conversion into a digital baseband, and for combination of the in-phase and quadrature paths of the digital samples delivered by the analog-digital conversion means. These means of conversion into a digital baseband thus enable a separation of the in-phase and quadrature paths to be accomplished simply for the digital signals (using, for example, four digital mixers and two adders). The remainder of the digital demodulation may be accomplished by the digital elements located downstream from these conversion and combination means.

The invention also concerns a method for reception of RF signals including at least the following steps:

a) transposition of signals of frequency $f_{RF}$ to a first intermediate frequency IF1<$f_{RF}$, b) bandpass filtering centred on IF1 of signals transposed in step a), c) sampling at a frequency fs<IF1 of signals filtered in step b), transposing said signals filtered in step b) to a second intermediate frequency $IF2=\alpha \cdot fs/M+fs/(M\cdot n)$, d) discrete-time filtering centred on second intermediate frequency IF2 of samples obtained in step c), e) decimation of a factor M of samples filtered in step d), transposing the samples filtered in step d) to a third intermediate frequency $IF3=fs/(M\cdot n)$, f) analog-digital conversion at a frequency fs/M of samples decimated in step e), where $\alpha$, n and M are strictly positive real numbers chosen such that:

$$\alpha < fs/(2 \cdot BW_{ch} \cdot M), \text{ and}$$

$$BW_{ch}/2 < fs/(M \cdot n),$$

with $BW_{ch}$: bandwidth of a channel of the received RF signals.

Such a method may, notably, be implemented by the reception device described above.

Step c) of sampling at frequency fs transposes the signal to second intermediate frequency $IF2=\alpha \cdot fs/M+IF3=\alpha \cdot fs/M+fs/(M\cdot n)$. In addition, decimation step e) transposes the signal to third intermediate frequency IF3.

The discrete-time filtering may be accomplished by an infinite impulse response function.

Step a) of transposition of the signals of frequency $f_{RF}$ to first intermediate frequency IF1 may include the accomplishment of a frequency convolution between the signals of frequency $f_{RF}$, between a maximum value $f_{RFmax}$ and a minimum value $f_{RFmin}$, and a signal of frequency $f_{OL}$ between $f_{RF}min-IF1$ and $f_{RF}max-IF1$, such that:

$$IF1 = N \cdot fs + \alpha \cdot fs/M + fs/(M \cdot n), \text{ and}$$

$$IF1 = F_{RF} - f_{OL}, \text{ and } f_{OL} = K \cdot fs,$$

Where K is a ratio chosen between $f_{OL}$ and fs, and N is the order of the harmonic transposing the signal from frequency IF1 to frequency IF2.

The method may also include, before implementation of step a) of transposition, a bandpass filtering step centred on frequency $f_{RF}$ followed by a step of low-noise amplification of the filtered signals.

The bandwidth of the bandpass filtering centred on frequency $f_{RF}$ may also be equal to or greater than the total bandwidth of the channels of the received RF signals.

The method may also include, between steps c) and d), the implementation of a step of selective distribution of the in-phase and quadrature components of the samples obtained in step c) over at least two paths, where steps d) to f) may then be applied to the components distributed over each of the paths.

BRIEF DESCRIPTION OF THE ILLUSTRATIONS

Figure 2:
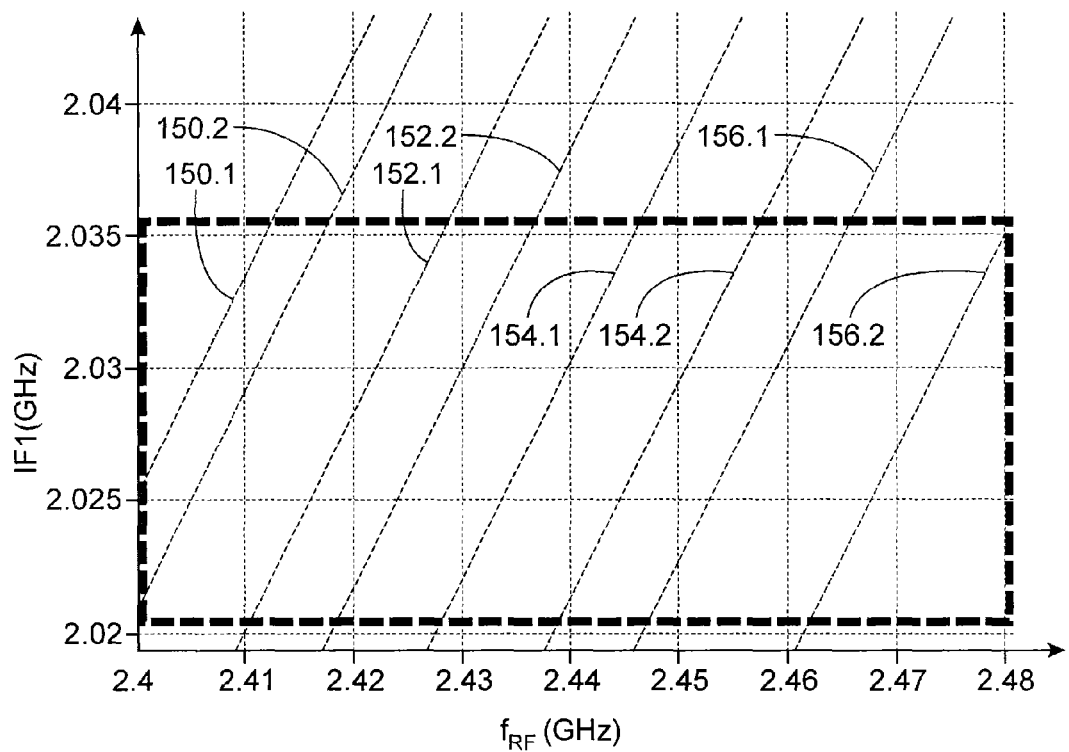
Figure 3:
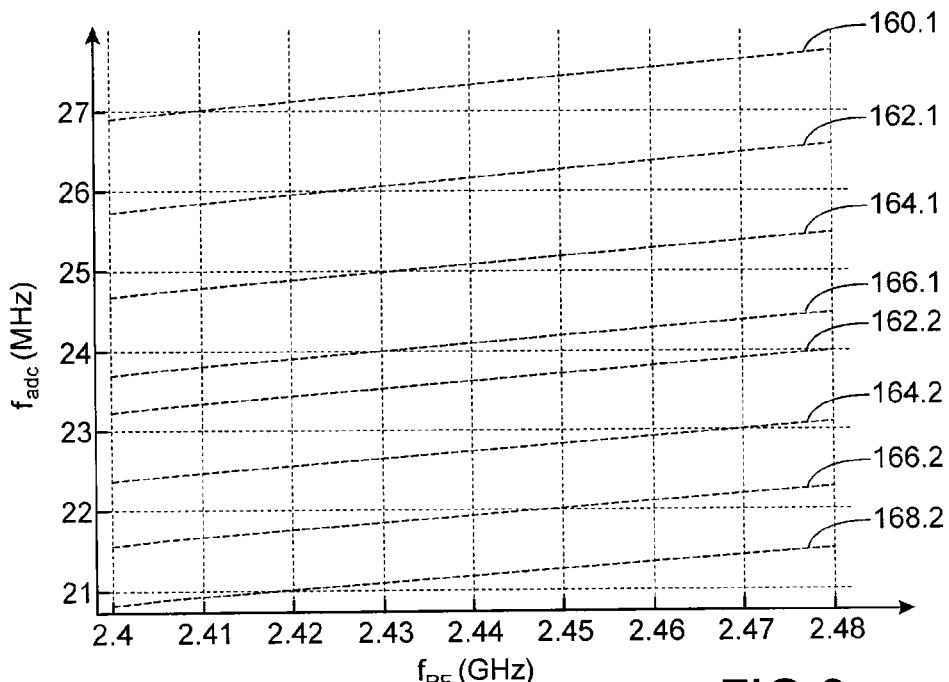
Figure 4:
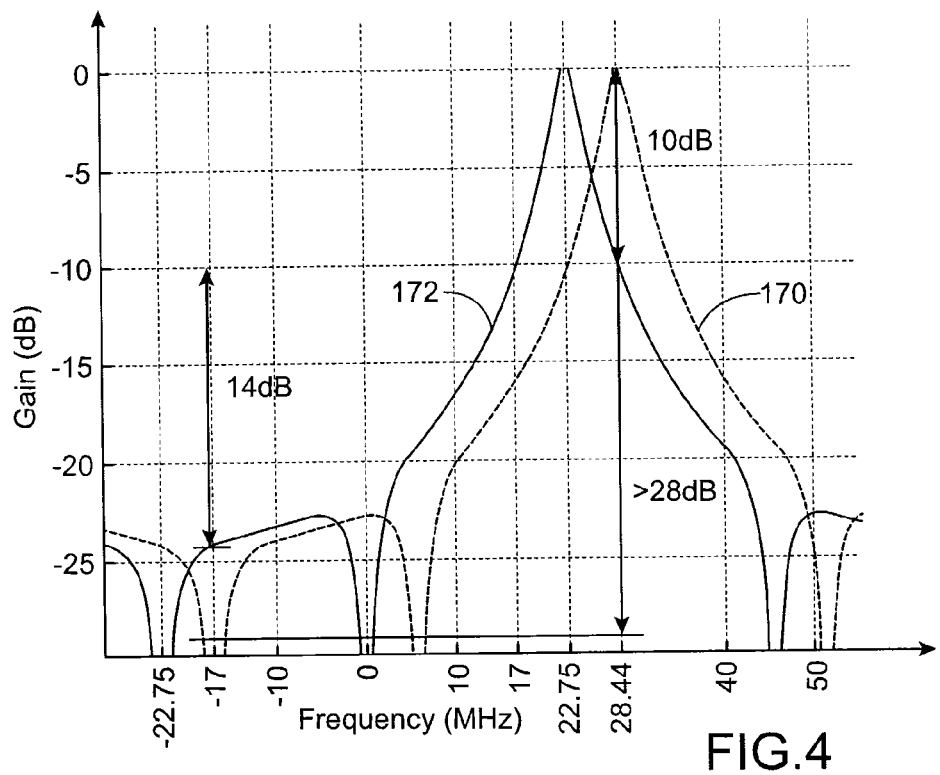
Figure 5:
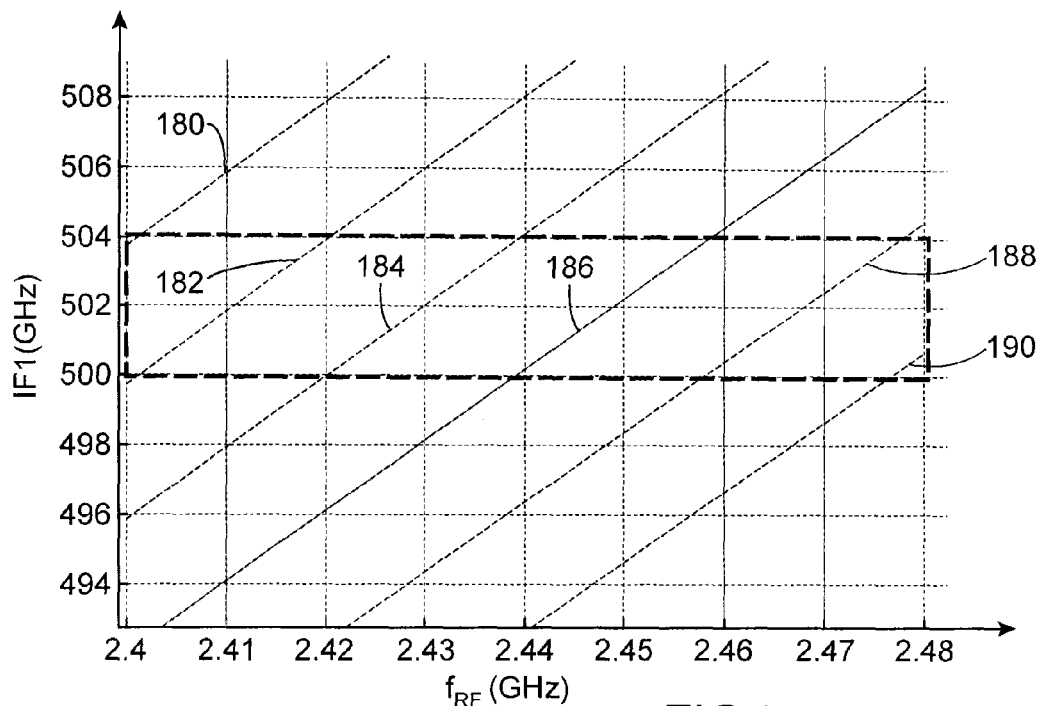
Figure 6:
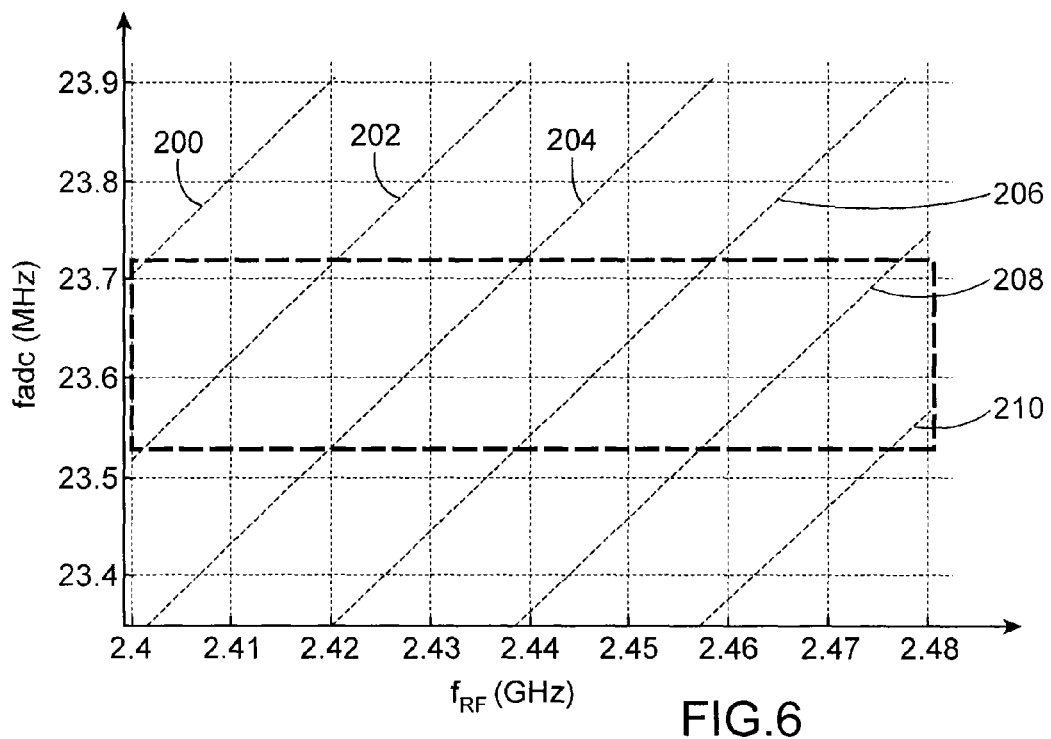
Figure 7:
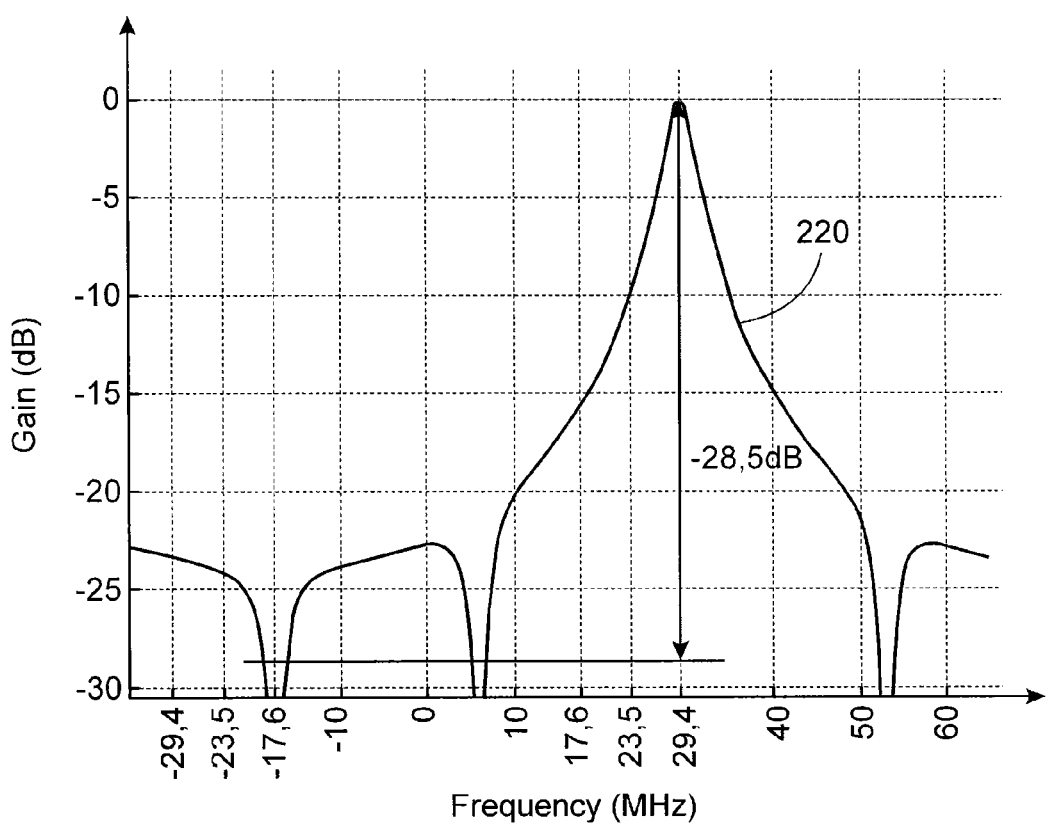
Figure 8A:
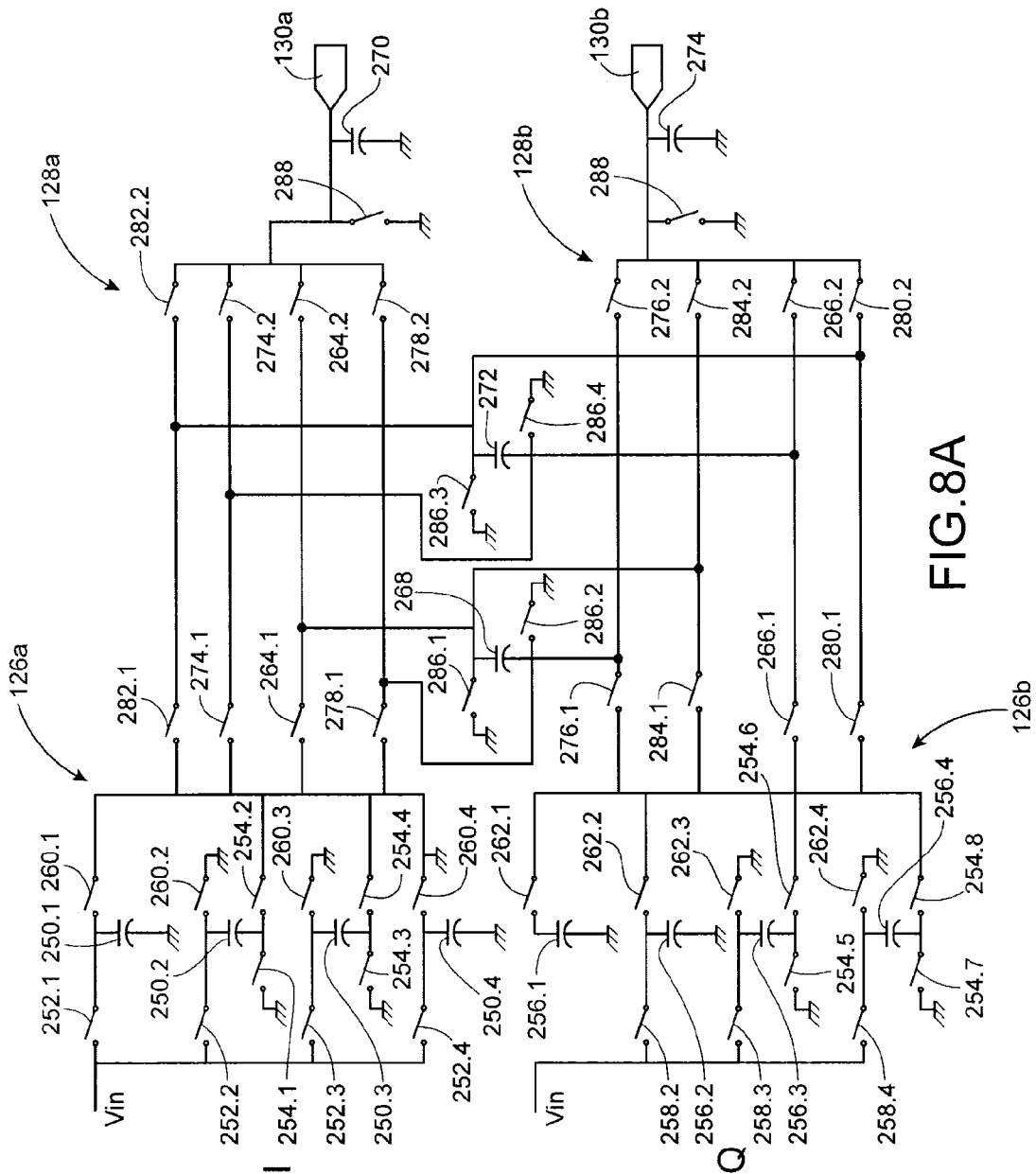
Figure 8B:
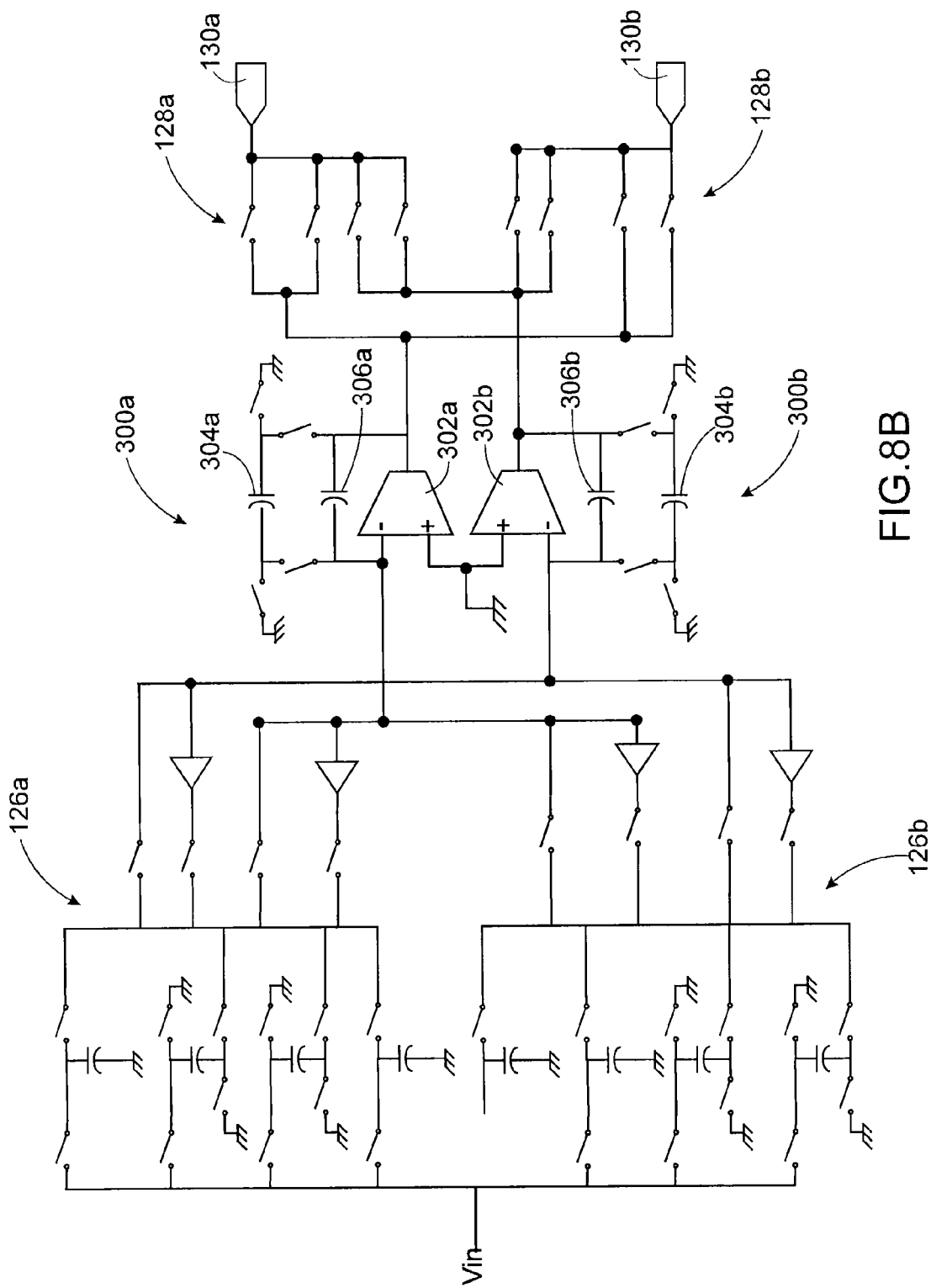
Figure 9:
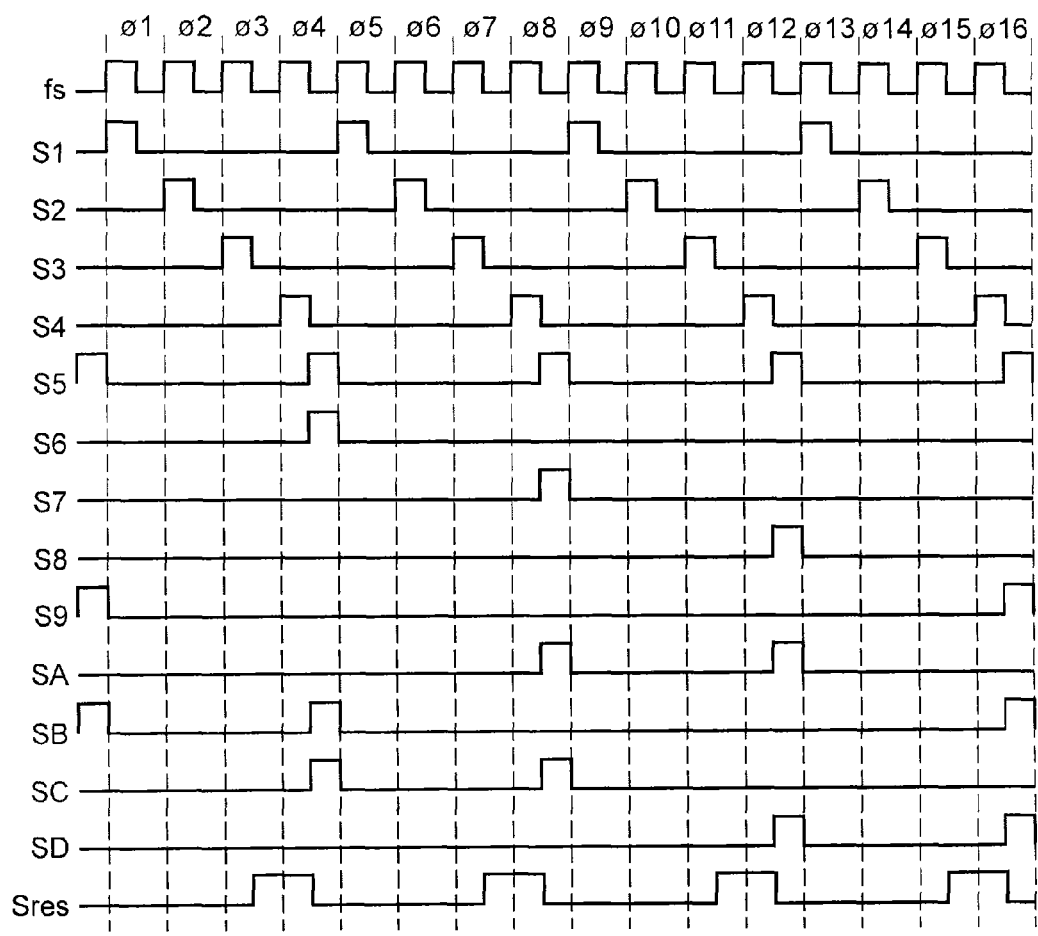

The present invention will be better understood on reading the description of example embodiments given purely as an indication and in no way restrictively, making reference to the appended illustrations in which:

FIG. 1 represents an RF reception device, object of the present invention, according to a particular embodiment, FIG. 2 represents the variations of IF1 as a function of $f_{RF}$, K and N in an RF reception device, object of the present invention, according to a first example embodiment, FIG. 3 represents the variations of $f_{adc}$ as a function of $f_{RF}$, K and N in the RF reception device, object of the present invention, according to the first example embodiment, FIG. 4 represents bandpass filtering functions obtained by IIR filters one of which forms part of the RF reception device, object of the present invention, according to the first example embodiment, FIG. 5 represents the variations of IF1 as a function of $f_{RF}$ and K in an RF reception device, object of the present invention, according to a second example embodiment, FIG. 6 represents the variations of $f_{adc}$ as a function of $f_{RF}$ and K in the RF reception device, object of the present invention, according to the second example embodiment, FIG. 7 represents a bandpass filtering function obtained by an IIR filter forming part of the RF reception device, object of the present invention, according to the second example embodiment, FIGS. 8A and 8B represent example embodiments of discrete-time filters and decimators of an RF reception device, object of the present invention, according to the first example embodiment, FIG. 9 represents timing diagrams of control signals sent to the switches represented in FIG. 8A to accomplish the filtering and decimation functions.

Identical, similar or equivalent portions of the various figures described below have the same numerical references, to make it easier to move from one figure to another.

The various parts represented in the figures are not necessarily represented at a uniform scale, in order to make the figures more readable.

The various possibilities (variants and embodiments) must be understood as not being mutually exclusive, and being able to be combined with one another.

DETAILED ACCOUNT OF PARTICULAR EMBODIMENTS

Reference will firstly be made to FIG. 1, which represents schematically an RF reception device 100 according to a particular embodiment.

Reception device 100 includes a first RF stage 102 including an antenna 104 intended to pick up RF signals.

First stage 102 also includes a first bandpass filter 106 to which the RF signals received by antenna 104 are then sent. First bandpass filter 106 has a bandwidth, for example, at least equal to the total bandwidth of the channels of the RF signals received. For example, in the case of signals compliant with the Bluetooth Low Energy and IEEE 802.15.4 standards, $f_{RF}$ varies between 2.4 GHz and 2.48 GHz. First bandpass filter 106 can therefore have a bandwidth equal to approximately 100 MHz centred on 2.44 GHz, and implement a −35 dB rejection of the signals located outside this band. The value of the non-band rejection accomplished by this first bandpass filter 106 will notably depend on the maximum tolerated degradation of the signal-to-noise ratio, and also on the technology with which bandpass filter 106 is produced. This first bandpass filter 106 enables the non-band blocking signals to be eliminated from the received RF signal. This bandpass filter 106 is, for example, of the BAW type (bulk acoustic wave filter).

Finally, first stage 102 includes a low-noise amplifier 108 (LNA) the input of which is connected to the output of first bandpass filter 106, thus enabling the signal filtered by first bandpass filter 106 to be amplified.

Reception device 100 includes a second stage 110 operating at a first intermediate frequency IF1<$f_{RF}$. This second stage 110 includes a mixer 112 acting as a frequency multiplier, accomplishing a frequency convolution and transposition of the signal obtained at the output of LNA 108 to frequency IF1. To accomplish this, mixer 112 receives at its input the output signal of LNA 108 together with a signal delivered by a local oscillator 114 delivering a periodic signal the frequency $f_{OL}$ of which is between $f_{RF}$min−IF1 and $f_{RF}$max−IF1. At the output of mixer 112 a signal transposed to IF1 is therefore obtained. It should be noted that first bandpass filter 106 also enables the image frequencies located at $f_{RF}$−2·IF1 to be filtered.

Second stage 110 also has a second bandpass filter 116 intended to filter the broadband noise, enabling an anti-aliasing filtering function to be accomplished. This second bandpass filter 116 is centred on IF1 and has a bandwidth equal, for example, to 20 MHz. The value of the bandwidth of this second filter 116 will be chosen according to several other parameters described in detail below. The analog filtering accomplished by second bandpass filter 116 at intermediate frequency IF1 then enables a voltage sampling to be accomplished of the filtered signal having a high subsampling rate, where the sampling can therefore be accomplished at low frequencies. Here too, the value of the non-band rejection accomplished by this second bandpass filter 116, equal for example to −35 dB, will notably depend on the tolerance concerning the maximum degradation of the signal-to-noise ratio, and also on the technology with which this second bandpass filter 116 is produced.

By producing local oscillator 114 and second bandpass filter 116 using BAW technology, both these elements can therefore use the same type of resonator, which enables the architecture to compensate for any technological variation and/or temperature variation. In addition, by producing local oscillator 114 using BAW technology, this oscillator has a high quality coefficient enabling the same performance to be attained in terms of phase noise as a quartz oscillator. In this case it will also be judicious to produce first bandpass filter 106 using BAW technology in order to produce these elements 106, 114 and 116 using standard lithography steps.

Reception device 100 includes a third stage 118 acting as a blocker-sampler and analog-digital converter of the signal, forming a complex subsampling network. This third stage 118 includes means 120 for sampling the signal at a frequency fs, transposing the signal derived from second bandpass filter 116 to a second intermediate frequency IF2<IF1. Reception device 100 also includes a frequency divider 124 of a configurable factor K connected between sampling means 120 and local oscillator 114, dividing the frequency of local oscillator 114 to obtain the sampling frequency. It is thus possible to have a single frequency synthesis circuit enabling the mixer's and sampler's controls to be generated.

The sampled signal is then sent over two paths 122a, 122b, each of which has a filter 126a and 126b, respectively at coefficients aI and aQ, enabling the in-phase and quadrature components of the signal sampled over both paths to be separated, and enabling them to be filtered in discrete time, accomplishing an active filtering (aI and aQ>1) or passive filtering (aI and aQ<1) at frequency IF2, enabling the image channel, and also the aliasing bands, to be filtered efficiently. Indeed, by optimising central frequency IF2 of discrete-time filters 126a, 126b the filtering order required to accomplish the rejections of the image frequencies can be reduced. Filters 126a, 126b are preferably filters of the IIR type (infinite impulse response filters), which are much more selective than FIR filters (finite impulse response filters) for a given number of coefficients of the filter.

The filtered signal is then decimated for each of paths 122a, 122b by a decimator 128a, 128b, reducing the sampling rate by a factor M and by this means transposing the signal to a frequency IF3<IF2. An analog-digital conversion at a frequency $f_{adc}$ of the signal is accomplished by analog-digital converters 130a, 130b.

Finally, device 100 includes a stage of conversion to a digital baseband 132 including four mixers 134a, 134b, 134c and 134d, and two adders 136a, 136b enabling, starting with the signals derived from mixers 134a to 134d, the demodulated in-phase (I(t)) and quadrature (Q(t)) signals to be obtained. Two of the mixers 134a, 134b have one of their inputs connected to the output of converter 130a, while the other two mixers 134c, 134d have one of their inputs connected to the output of converter 130b. In addition, mixers 134a and 134d receive at their second input the digital coefficients corresponding to a signal of the sine type (0, 1, 0, −1, etc.), whereas mixers 134b and 134c receive at their second input the digital coefficients corresponding to a signal of the cosine type (1, 0, −1, 0, etc.). Adder 136a sums the signals obtained at the outputs of mixers 134b and 134d, and adder 136b deducts the signal obtained at the output of mixer 134c from the signal obtained at the output of mixer 134a.

The signals, for example interferers which are not located in the channel of interest, present in the in-phase and quadrature demodulated signals, can be filtered by digital filtering elements located downstream from adders 136a, 136b.

It is now described how the frequency plan of receiver 100 is defined, i.e. how the working frequencies of the various elements of receiver 100, together with the frequencies of the signals which it is desired to obtain in the various stages of receiver 100, are chosen.

The initial element is the frequency of the analog-digital converters $f_{adc}$ which is imposed according to the digital signal which it is desired to obtain at the output of receiver 100, together with other constraints such as the maximum authorised consumption. In the aim of being able to optimise the frequencies multiplication accomplished by mixers 134a to 134d, IF3 is defined such that it is an integral sub-multiple of $f_{adc}$:

$$IF3 = f_{adc}/n \quad (1)$$

where n is a real number chosen, for example, from a range between $4 < n < 2 \cdot f_{adc}/BW_{ch}$.

The distance between IF2 and $f_{adc}$ also defines IF3 such that:

$$IF3 = IF2 - \alpha \cdot f_{adc} \quad (2)$$

i.e.: $$IF2 = \alpha \cdot f_{adc} + f_{adc}/n \quad (3)$$

Due to discrete-time filters 126a, 126b used and the accomplished decimation, $f_{adc}$ is also an integral sub-multiple M of fs:

$$f_{adc} = fs/M \quad (4)$$

The following equation is therefore obtained:

$$IF2 = \alpha \cdot fs/M + fs/(M \cdot n) \quad (5)$$

Between IF1 and fs there is a high subsampling rate. It is a harmonic of order N which transposes the signal from IF1 to IF2 such that:

$$IF2 = IF1 - N \cdot fs \quad (6)$$

From equation (6), the following can then be deduced:

$$IF1 = N \cdot fs + \alpha \cdot fs/M + fs/(M \cdot n) \quad (7)$$

If fs is a frequency determined relative to frequency IF1, frequency $f_{OL}$ of the local oscillator is independent of fs and then varies according to the channel chosen to be demodulated:

$$f_{OL} = f_{RF} - IF1 \quad (7)$$

It can therefore be seen that choosing a high IF1 frequency enables the frequency $f_{OL}$ which must be generated to be reduced.

The value of IF1 is then chosen. In order to prevent the frequency synthesis being very complex, which would lead to a complex design of the elements of reception device 100, and to prevent a need for two independent synthesis circuits, a limited fractional ratio K (for example K=3.5; 4.5; 4) can link frequency $f_{OL}$ of the local oscillator and fs such that:

$$f_{OL} = K \cdot fs \quad (9)$$

If fs and IF1 are taken to be variables, the values of n, M, N and K can be chosen in order to obtain the minimum variations of $f_{adc}$ and IF1 for the demodulation of each $f_{RF}$ channel, whilst satisfying the filtering constraints required by the RF reception standard.

The variation of IF1 ($\Delta IF1$) and its central value $IF1c$ are given by the following equations:

$$\Delta IF1 = f_{RFmax}((N_2+C)/(K_2+N_2+C) - (N_1+C)/(K_1+N_1+C)) \quad (10)$$

$$IF1c = f_{RFmax}(N_2+C)/(K_1+N_1+C) - \Delta IF1/2 \quad (11)$$

where:

$$K_2 = K_1 + \Delta K \quad (12)$$

$$N_2 = |(N_1 \cdot K_2)/K_1| \quad (13)$$

$$C = \alpha/M + 1/(M \cdot n) \quad (14)$$

$K_1, K_2, N_1$ and $N_2$ are particular values of parameters K and N for which, for a given value of IF1, the successive pairs ($K_1, N_1$) and ($K_2, N_2$) correspond to the values of $f_{RF}$ which are most far apart from one another, considering all the pairs (Kx, Nx) of a given window of values of $f_{RF}$. Determination of the values of $K_1, K_2, N_1$ and $N_2$ will be described in detail below in connection with FIG. 2.

The equation relating $f_{RF}$ and fs then becomes:

$$f_S = f_{RF}\left(\frac{M \cdot n}{K \cdot M \cdot n + N \cdot M \cdot n + \alpha \cdot n + 1}\right) \quad (15)$$

where:
M: order of decimation of decimators 128a, 128b,
K: Ratio between $f_{OL}$ and fs,
N: harmonic number to accomplish the frequency transposition from IF1 to IF2,
n: Ratio between IF3 and $f_{adc}$,
α: harmonic number between $f_{adc}$ and IF2

The reconfigurable character of reception device 100 is illustrated notably by the fact that either a high intermediate frequency IF1 or a low intermediate frequency IF1 can be used.

A first example embodiment is given below in the case of a high intermediate IF1 frequency.

It is deduced from the equations shown above that, in order to simplify the synthesis of frequencies, frequencies $f_{OL}$, fs and $f_{adc}$ are considered to be related by integral ratios or multiples of 0.5 (ΔK=0.5). To demonstrate the above equations reception device 100 is considered to be compliant with the specifications of the Bluetooth Low Energy and IEEE 802.15.4 standards. Frequency $f_{RF}$ varies from 2.4 GHz to 2.48 GHz with a frequency interval of 1 MHz between each channel. In this first example, it is desired to have the value of IF1 at around 2 GHz, since this choice is in keeping with the developments of the Lamb wave BAW filters envisaged in this architecture. Generally, when a high intermediate frequency IF1 is chosen, the value of IF1 may be less than or equal to approximately 2.1 GHz.

Given that it is desired to reduce the consumption of device 100, and that the operating frequency of analogue-digital converters is, for example, chosen such that it is greater than approximately four times the bandwidth of a channel of the standard of the received signals, a choice of $f_{adc}$ equal to approximately 25 MHz enables converters 130a, 130b to be produced with low-consumption architectures. Concerning the ratio between IF3 and $f_{adc}$, n=4 is chosen, for example, where n is an integer which may be between 4 and $2 \cdot f_{adc}/BW_{ch}$. By choosing n=4, the bandwidth of the channel to be demodulated $BW_{ch}$ can thus be maximised relative to the Nyquist band $f_{adc}/2$. Equations (8), (9) and (15) show that if parameters M, N, K and α do not vary, fs and IF1 will vary by approximately 80 MHz (80 MHZ=2.48 GHz−2.4 GHz). And M, which is the order of decimation of the discrete-time filter, is a parameter related to the discrete-time filtering function which depends on the structure of the circuit which implements this function. The choice may be made, for example, to produce a $4^{th}$ order filtering network, i.e. to choose M=4, given that such a filter is the simplest one capable of meeting the specifications of the chosen standards. By choosing M=4 and α=1, fs is then defined as equal to approximately 100 MHz.

By considering the value of IF1 to be equal to approximately 2 GHz and that of $f_{RF}$ to be between 2.4 GHz and 2.48 GHz, it may be deduced from equation (8) that $f_{OL}$ is between approximately 400 MHz and 480 MHz. In addition, the ratio between $f_{OL}$ and fs is limited by an integral value or a multiple of 0.5·K (K={4; 4.5}) in order that $f_{adc}$ has a value equal to approximately 25 MHz.

FIG. 2 represents the values of IF1 depending on the values of $f_{RF}$, for different values of K and N. By choosing a window in which the value of IF1 varies between 2.02 GHz and 2.036 GHz (and with $f_{RFmax}$=2.48 GHz, $K_1$=4, $N_1$=18, $K_2$=4.5, $N_2$=21, C=5/16, i.e. ΔIF1=12.245 MHz), it is observed that the band of $f_{RF}$ varying between 2.4 GHz and 2.48 GHz is completely covered by straight lines 150.1 to 156.2 corresponding to values of K=4 or 4.5, and for N varying from 18 to 24. Straight lines 150.1, 152.1, 154.1 and 156.1 correspond to the cases in which K=4.5, and straight lines 150.2, 152.2, 154.2 and 156.2 correspond to the cases in which K=4. In addition, straight lines 150.1, 152.1, 154.1 and 156.1 correspond respectively to the cases in which N=24, 23, 22 and 21, and straight lines 150.2, 152.2, 154.2 and 156.2 correspond respectively to the cases in which N=21, 20, 19 and 18. It can be seen in FIG. 2 that the values of $K_1$, $K_2$, $N_1$ and $N_2$ can be determined by determining which adjacent straight lines, among straight lines 150.1 to 156.2, are those most far apart from one another. In the example of FIG. 2 straight lines 156.1 and 156.2 correspond to pairs $(K_1, N_1)$=(4, 18) and $(K_2, N_2)$=(4.5, 21).

It can also be seen in this FIG. 2 that to cover the entire band $f_{RF}$ a change of mode corresponding to a change of the value of K or N means that IF1 does not have to vary as much as $f_{RF}$. In this example IF1 varies by 16 MHz over the entire band of $f_{RF}$. Thus, second bandpass filter 116 can therefore have a bandwidth equal to or greater than approximately 20 MHz centred on value IF1=2.028 GHz. It can therefore be seen that the value of bandwidth $BW_{IF1}$ of second bandpass filter 116 depends on the value of frequency IF1, and therefore on advance step ΔK of parameter K (ΔK=0.5 in the above example), and on the bandwidth of the channel $BW_{ch}$:

$$BW_{IF1} = \Delta IF1 + BW_{ch} \quad (16)$$

where $\Delta IF1 = IF1_{max} - IF1_{min}$

FIG. 3 represents the values of $f_{adc}$ as a function of the values of $f_{RF}$, for K=4 and N varying from 18 to 21 (straight lines referenced 160.1, 162.1, 164.1 and 166.1) or K=4.5 and N varying from 21 to 24 (straight lines referenced 162.2, 164.2, 166.2 and 168.2).

The table below gives the values of the frequencies and of the parameters of the various elements of RF reception device 100, i.e. the frequencies of the accomplished frequency synthesis, together with the values of the different intermediate frequencies for the channel $f_{RF}$=2.44 GHz, in this first example embodiment.

| $f_{OL}$ | fs | $f_{adc}$ | IF1 | IF2 | IF3 | K | M | N |
|---|---|---|---|---|---|---|---|---|
| 409.51 MHz | 91 MHz | 22.751 MHz | 2.0305 GHz | 28.438 MHz | 5.688 MHz | 4.5 | 4 | 4 |

Curve 170 represented in FIG. 4 represents the filtering function accomplished by the combination of IIR-type discrete-time filters I+jQ (126a+j126b) of this first example. It can be seen in this FIG. 4 that this filter is indeed centred on IF2=28.438 MHz, where the signal of interest is located. The image frequency relative to the decimation (IF2−2·IF3) is equal to 17 MHz. It can be seen that the rejection accomplished at −17 MHz by this filter is greater than at −28 dB. By way of comparison, curve 172 represents a bandpass filtering function of a shape similar to that of graph 170, but which would be centred on frequency $f_{adc}$=fs/4=22.75 MHz. It can be seen that, in this case, the rejection accomplished at −17 MHz would only be −14 dB. In addition, it can also be seen that at IF2 the filtering accomplished whilst being centred on IF2 is approximately 10 dB higher than the filtering centred on fs/4.

A second example embodiment of RF reception device 100 is described below, this time in the case of a low IF1 intermediate frequency, for example of a value equal to approximately 500 MHz. Here too, reception device 100 is considered to be compliant with the specifications of the Bluetooth Low Energy and IEEE 802.15.4 standards. Generally, when a low intermediate frequency IF1 is chosen, the value of IF1 may be greater than or equal to approximately 160 MHz.

To maintain the low-consumption character of RF reception device 100, the same frequencies presented initially for the analog-digital converter of the first example above will be used ($f_{adc}$=25 MHz). In order to have the same filtering function as the one represented in FIG. 4, certain parameters are also kept at the same values: M=4, n=4 and α=1.

Compared to the first example embodiment described above, the value of fs is close to that of IF1, and N is considered to be constant (N=5). Parameter κ will therefore be used as a variable. And given that frequency $f_{OL}$ will be higher than in the first example embodiment, the values of K will be higher.

In a manner comparable to FIG. 2, curves 180 to 190 of FIG. 5 represent the values of IF1 as a function of the values of $f_{RF}$ for different values of K. By choosing a window in which the value of IF1 varies between 500 MHz and 504 MHz, it is observed that the band of $f_{RF}$ varying between 2.4 GHz and 2.48 GHz is fully covered by straight lines 180 to 190 corresponding to values of K varying from 20 (straight line 180) to 21 (straight line 190) with a step ΔK=0.2. In this second example IF1 varies by 4 MHz over the entire band of $f_{RF}$. Thus, second bandpass filter 116 can therefore have a bandwidth equal to or greater than approximately 6 MHz of central frequency equal to 502 MHz. It should be noted that values of K below 20 or above 21 would enable reception device 100 to accomplish filtering functions in other reception frequency bands.

FIG. 6 represents the values of $f_{adc}$ as a function of the values of $f_{RF}$, for values of K varying from 20 (straight line 200) to 21 (straight line 210) with a step of 0.2. It can be seen in this FIG. 6 that to cover the chosen band $f_{RF}$, $f_{adc}$ varies by less than 500 KHz and is centred on the value 23.63 MHz.

The table below gives the values of the frequencies and of the parameters of the various elements of RF reception device 100 according to the second example embodiment, together with the values of the different intermediate frequencies for channel $f_{RF}$=2.44 GHz.

| $f_{OL}$ | fs | $f_{adc}$ | IF1 | IF2 | IF3 | K |
|---|---|---|---|---|---|---|
| 1.9398 GHz | 94.163 MHz | 23.541 MHz | 500.24 MHz | 29.426 MHz | 5.885 MHz | 20.6 |

The values of parameters M and N are both equal to 4.

Curve 220 represented in FIG. 7 represents the filtering function accomplished by second IIR bandpass filter 116 of this second example embodiment. It can be seen in this FIG. 7 that the filter is indeed centred on IF2=29.426 MHz, exactly where the signal of interest is located. The image frequency relative to the decimation (IF2−2·IF3) is equal to 17.6 MHz. It can be seen that the rejection accomplished at −17.6 MHz by second bandpass filter 116 is greater than −28.5 dB.

The multistandards character of RF reception device 100 is illustrated by the fact that the discrete-time filtering network of device 100 does not change whatever the channel to be demodulated and the standard of the RF signals received (between standard IEEE 802.15.4 and the Bluetooth Low Energy standard). By using an IIR-type discrete-time filtering function, the signals (interferers) adjacent to the channel of interest are filtered very substantially. Since they are responsible for the saturation of the analog-digital converter, these interferers limit the maximum gain which can be applied in the reception chain. And it is possible to apply more gain in the chain (of the same order as the filtering of the most powerful interferer). Thus, the actual number of bits of the analog-digital converter can be reduced with each 6.2 dB of rejection of the most powerful interferer.

The digital signal processing part is located downstream from analog-digital converters 130a, 130b may in particular be able to accomplish different demodulations and use different error correction codes and different processing functions in order to be able to process signals of different communication standards.

Operating frequency $f_{adc}$ of analog-digital converters 130a, 130b may be chosen preferably to be low in order to reduce the consumption of these converters as far as possible.

The bandwidth of discrete-time filters 126a, 126b notably depends on the bandwidth of the modulated signal. It is, for example, possible to produce the discrete-time filters such that their bandwidth, for example at −3 dB, matches the bandwidth of a channel which it is desired to demodulate. The rejection of the band at $f_{adc}/2$ accomplished by filters 126a, 126b gives major advantages in terms of the channel filtering, and consequently enables the dynamic range of the analog-digital converters to be reduced.

Depending on the technology available to produce the filtering means at first intermediate frequency IF1, the circuit may be in a high IF1 or low IF1 configuration. In the case of a high IF1 the reference frequencies ($f_{OL}$ and fs) can be appreciably reduced. Conversely, the bandwidth of the sampling circuits is greater in this case. In a low-IF1 configuration the constraints are reversed, frequency $f_{OL}$ being greater and the bandwidth of the sampling circuits being smaller.

An example embodiment of the separation of the in-phase and quadrature paths and of discrete-time filters 126a, 126b and of decimators 128a, 128b of RF reception device 100 according to the first example embodiment described above is represented in FIG. 8A. Filter 126a of the in-phase path of device 100 includes four first capacitors 250.1 to 250.4 intended to be charged in succession at a frequency equal to fs by the successive closure of switches 252.1 to 252.4. The unit value of the capacitors (C1I=1) notably depends on a noise and bandwidth analysis of the system, where the values of the other capacitors are equal to ratios of the unit capacitance. The values of capacitors 250.1 to 250.4 (expressed as a ratio relative to unit value C1I) are as follows:

$C1I(250.1)=1$ $C2I(250.2)=0.38$ $C3I(250.3)=0.71$ $C4I(250.4)=0.92$

The ratios between the values of these capacitors are equal to the values of coefficients I of the numerator of the filter. Capacitors the gains of which are intended to be negative (in this case, capacitors 250.2 and 250.3) include means of reversal of polarity formed by additional switches 254.1-254.4 connected to capacitors 250.2 and 250.3.

Filter 126b of the quadrature path of device 100 includes four first capacitors 256.1 to 256.4, where the three capacitors 256.2 to 256.4 are intended to be charged in succession at a frequency equal to fs by the successive closure of switches 258.2 to 258.4. First capacitor 256.1 is not connected to the input signal ($aQ_1=0$). Conversely, this first capacitor enables the equivalent impedance of the combination of capacitors 252.1 to 252.4 to be the same as that of the combination of capacitors 256.1 to 256.4. The values of the ratios of capacitors 256.1 to 256.4 are as follows:

$$C1Q(256.1)=1$$

$$C2Q(256.2)=0.92$$

$$C3Q(256.3)=0.71$$

$$C4Q(256.4)=0.38$$

The values of capacitors 256.2 to 256.4 are equal to the values of the Q coefficients of the numerator of the filter. The capacitors the gains of which are intended to be negative (in this case, capacitors 256.3 and 256.4) also include means of reversal of polarity formed by additional switches 254.5-254.8 connected to capacitors 256.3 and 256.4.

The values of the coefficients of filters 126a, 126b are also defined by capacitors 250.1-250.4 and 256.1-256.4. Filters 126a, 126b also include switches 260.1 to 260.4, 262.1 to 262.4, 264.1-264.2 and 266.1-266.2 which, by closing, allow charges to be redistributed, where capacitors 250.1-250.4 then balance their charges with capacitors 268 and 270, and capacitors 256.1-256.4 also balance their charges with capacitors 272 and 274. This redistribution of charges at the same time makes a weighted sum of the samples stored in capacitors 250.1-250.4 and 256.1-256.4 and also accomplishes the decimation. However, capacitors 270 and 274 are discharged before the weighted sum is made. Conversely, capacitors 268 and 272, which form the negative feedback of filters 126a and 126b which are in this case of the IIR type, are not discharged since they are intended to contain a part of the sample of the output, which represents the denominator of an IIR filter. When filters 126a, 126b are not of the IIR type these capacitors 268 and 272 are not present. Thus, the ratio between the value of capacitors 250.1-250.4, 268 and 270, and also the ratio between the value of capacitors 256.1-256.4, 272 and 274, represent the values of the denominators of the I and Q coefficients of filters 126a and 126b, which are in this case equal to −0.6 (and therefore the values of capacitors 268 and 272 are equal to 7.5 and the values of capacitors 270 and 274 are equal to 1). Switches 274.1-274.2 and 276.1-276.2 installed in parallel to switches 264.1-264.2 and 266.1-266.2 are used in a following charge cycle of capacitors 250.1-250.4 and 256.1-256.4, enabling capacitors 268 and 272 to be reversed (called rotating capacitors), and enabling the charges to be balanced in the in-phase and quadrature paths. The operation enables the IIR poles of filters 126a, 126b to be staggered. To produce operator −j·0.6 (the operator of the denominator of I and Q coefficients of filters 126a, 126b), the output sample of the in-phase path is subtracted from the input samples of the quadrature path and the output sample of the quadrature path is added to the input samples of the in-phase path. The other charge cycles are accomplished by means of switches 278.1-278.2, 280.1-280.2, 282.1-282.2 and 284.1-284.2 installed in parallel to switches 264.1-264.2 and 266.1-266.2. In addition, the changes of signs are accomplished through switches 286.1-286.4. The values of the in-phase and quadrature signals at output from the decimation are kept in capacitors 270 and 274 for a period equal to $1/(2 \cdot f_{adc})$, for the analog-digital conversion. Before a new redistribution of the charges at $f_{adc}$, capacitors 270 and 274 are discharged by switches 288. Thus, the negative feedback of the IIR filters depends only on capacitors 268 and 272, and not on the capacitors at the input of analog-digital converters 270 and 274.

A second example embodiment of the separation of the in-phase and quadrature paths and of discrete-time filters 126a, 126b and of decimators 128a, 128b of RF reception device 100 according to the first example embodiment described above is represented in FIG. 8B.

As in the first example embodiment described in connection with FIG. 8A, filters 126a, 126b are of the IIR type. However, in this case, filters 126a, 126b are formed by inverse integrators 300a, 300b produced from operational transconductance amplifiers (OTA) 302a, 302b. The values of the gains of the negative feedback loops of these filters depend notably on the values of capacitors 304a, 304b and 306a, 306b installed as negative feedback of OTAs 302a, 302b. For example, for filter 126a, its gain is equal to:

$$\frac{C1I + C2I + C3I + C4I}{C_{304a} + C_{306a}}$$

Similarly, for filter 126b, its gain is equal to:

$$\frac{C1Q + C2Q + C3Q + C4Q}{C_{304b} + C_{306b}}$$

In addition, the selectivity β of each of filters 126a, 126b is also defined according to the values of capacitors 304a, 304b, 306a, 306b such that:

$$\beta = \frac{C_{306}}{C_{304} + C_{306}}$$

Thus, by choosing the values of capacitors 304 and 306, it is possible to modify their gain and/or selectivity values, and these filters 126a, 126b are therefore reconfigurable.

FIG. 9 represents timing diagrams illustrating the operation of filters 126a, 126b and of decimators 128a, 128b described above in connection with FIGS. 8A and 8B.

The signal represented in the first line represents sampling frequency fs. The signals of the following lines represent the control signals sent to the different switches represented in FIG. 8A. In the case of these control signals, a low level corresponds to an open state of the switch, and a high level corresponds to a closed state of the switch. The table below gives the correspondence between the different signals of the timing diagram of FIG. 9 and the switches represented in FIG. 8A.

| Control signal | Controlled switches |
| --- | --- |
| S1 | 252.1 |
| S2 | 252.2; 254.1; 258.2 |
| S3 | 252.3; 254.3; 258.3; 254.5 |
| S4 | 252.4; 258.4; 254.7 |
| S5 | 254.2; 254.4; 254.6; 254.8; 260.1-260.4; 262.1-262.4 |
| S6 | 264.1-264.2; 266.1-266.2 |
| S7 | 274.1-274.2; 276.1-276.2 |
| S8 | 278.1-278.2; 280.1-280.2 |
| S9 | 282.1-282.2; 284.1-284.2 |
| SA | 286.1 |

-continued

| Control signal | Controlled switches |
|---|---|
| SB | 286.2 |
| SC | 286.3 |
| SD | 286.4 |
| Sres | 288 |

It can notably be seen in this timing diagram that the redistribution of charges and the decimation are accomplished, for example, during period Φ4 during which signal S4 returns to the low state and signals S5 and S6 change from the high state (comparable situation during period Φ8 with signals S4, S5 and S7, during period Φ12 with signals S4, S5 and S8, and period Φ16 with signals S4, S5 and S9).

In a variant of the embodiments described above, it is possible that the IF1 value of second bandpass filter 116 is a chosen fixed value which does not depend on N, fs, α, M and n. However, in this case, reception device 100 will include two frequency synthesis circuits. Reception device 100 then includes a second local oscillator controlling sampler 120, and frequency divider 124 is not present. In this case, the bandwidth of the IF1 filter may be reduced to the width of one channel of the standard of the received signal.

The invention claimed is:

1. A radio frequency signal reception device comprising:
    a transposition device of signals of frequency $f_{RF}$ to a first intermediate frequency IF1<$f_{RF}$;
    a first bandpass filter centered on IF1 of signals transposed to IF1;
    a sampler at a frequency fs<IF1 of signals delivered by the first filter, transposing the signals delivered by the first bandpass filter to a second intermediate frequency IF2=α·fs/M+fs/(M·n), wherein M is a decimation factor and n is a ratio between fs/M and a third intermediate frequency IF3;
    a second discrete-time filter centered on the second intermediate frequency IF2 of samples delivered by the sampler;
    a decimation device of the factor M of samples delivered by the second discrete-time filter, transposing the samples delivered by the second discrete-time filter to the third intermediate frequency IF3=fs/(M·n);
    an analog-digital converter, operating at a frequency fs/M, of samples delivered by the decimation device,
    where α, n and M are strictly positive real numbers chosen such that:

$\alpha < fs/(2 \cdot BW_{ch} \cdot M)$, and $BW_{ch}/2 < fs/(M \cdot n)$, with $BW_{ch}$: bandwidth of a channel of the received RF signals.

2. The device according to claim 1, wherein the second discrete-time filter includes at least one infinite impulse response filter.

3. The device according to claim 1, wherein the transposition device of signals of frequency $f_{RF}$ to the first intermediate frequency IF1 includes a mixer configured to accomplish a frequency convolution between signals of frequency $f_{RF}$, of between a maximum value $f_{RFmax}$ and a minimum value $f_{RFmin}$, and a signal intended to be delivered by a local oscillator of frequency $f_{OL}$ of between $f_{RF}$min−IF1 and $f_{RF}$max−IF1, such that:

$IF1 = N \cdot fs + \alpha \cdot fs/M + fs/(M \cdot n)$, and $IF1 = f_{RF} - f_{OL}$, with $f_{OL} = K \cdot fs$, where K is a ratio chosen between $f_{OL}$ and fs, and N is the order of the harmonic transposing the signal from frequency IF1 to frequency IF2.

4. The device according to claim 3, wherein frequency fs and parameters α, n, M, N and K are chosen such that:

$BW_{IF1} \geq \Delta IF1 + BW_{ch}/2$ with $BW_{IF1}$: bandwidth of the first filter, and
$\Delta IF1$: variation of IF1 when $f_{RF}$ varies between $f_{RFmax}$ and $f_{RFmin}$.

5. The device according to claim 1, wherein frequency fs and parameters α, n and M are chosen such that:

$BW_{IF1} \geq 2BW_{ch}$ with $BW_{IF1}$: bandwidth of the first filter.

6. The device according to claim 1, further comprising at least one reception antenna connected to an input of bandpass filter centered on frequency $f_{RF}$, one output of which is connected to an input of a low-noise amplifier, where an output of the low-noise amplifier is connected to an input of the transposition device of signals of frequency $f_{RF}$ to first intermediate frequency IF1.

7. The device according to claim 6, wherein a bandwidth of the bandpass filter centered on frequency $f_{RF}$ is equal to or greater than the total bandwidth of the channels of the RF signals intended to be received by the antenna and/or the bandpass filter centered on frequency $f_{RF}$ includes at least one filter of the BAW/FBAR type.

8. The device according to claim 1, wherein the first bandpass filter centered on IF1 includes at least one filter of BAW type, and/or when the transposition device of the signals of frequency $f_{RF}$ to first intermediate frequency IF1 includes a local oscillator, wherein the local oscillator includes a resonator of the BAW type.

9. The device according to claim 1, further comprising a selective distribution device of in-phase and quadrature components of samples delivered by the sampler over separate paths, and wherein the decimation device and the analog-digital converter are present in each of the paths.

10. The device according to claim 1, further comprising a device for conversion into a digital baseband, and for combination of in-phase and quadrature paths of digital samples delivered by the analog-digital converter.

11. A method of reception of radio frequency signals comprising:
    a) transposition of signals of frequency $f_{RF}$ to a first intermediate frequency IF1<$f_{RF}$;
    b) bandpass filtering centered on IF1 of signals transposed in a);
    c) sampling at a frequency fs<IF1 of signals filtered in b), transposing the signals filtered in b) to a second intermediate frequency IF2=α·fs/M+fs/(M·n), wherein M is a decimation factor and n is a ratio between fs/M and a third intermediate frequency IF3;
    d) discrete-time filtering centered on second intermediate frequency IF2 of samples obtained in c);
    e) decimating the factor M of samples filtered in d), transposing the samples filtered in d) to the third intermediate frequency IF3=fs/(M·n);
    f) analog-digital conversion at a frequency fs/M of samples decimated in e);
    where α, n and M are strictly positive real numbers chosen such that:

$\alpha < fs/(2 \cdot BW_{ch} \cdot M)$, and $BW_{ch}/2 < fs/(M \cdot n)$, with $BW_{ch}$: bandwidth of a channel of the received RF signals.

12. The method according to claim 11, wherein the discrete-time filtering is accomplished by an infinite impulse response function.

13. The method according to claim 11, wherein a) of transposition of the signals of frequency $f_{RF}$ to first intermediate frequency IF1 includes accomplishment of a frequency convolution between the signals of frequency $f_{RF}$, between a maximum value $f_{RFmax}$ and a minimum value $f_{RFmin}$, and a signal of frequency $f_{OL}$ between $f_{RF}$min–IF1 and $f_{RF}$max–IF1, such that:

$$IF1 = N \cdot fs + \alpha \cdot fs/M + fs/(M \cdot n),\text{ and}$$

$$IF1 = F_{RF} - f_{OL},\text{ and } f_{OL} = K \cdot fs,$$

where K is a ratio chosen between $f_{OL}$ and fs, and N is the order of the harmonic transposing the signal from frequency IF1 to frequency IF2.

14. The method according to claim 13, wherein, before implementation of a) of transposition, a bandpass filtering centered on frequency $f_{RF}$ of the RF signals received, followed by a low-noise amplification of the filtered signals.

15. The method according to claim 14, a bandwidth of the bandpass filtering centered on frequency $f_{RF}$ is equal to or greater than the total bandwidth of the channels of the received RF signals.

16. The method according to claim 11, which further comprises, between c) and d), implementation of a selective distribution of in-phase and quadrature components of the samples obtained in c) over separated paths, where d) to f) are then applied to the components distributed over each of the paths.

* * * * *